(12) United States Patent
Zhang et al.

(10) Patent No.: US 12,646,209 B1
(45) Date of Patent: Jun. 2, 2026

(54) AUTONOMOUS MOBILE MACHINE, CONTROLLER, AND CONTROL METHOD FOR AUTONOMOUS MOBILE MACHINE

(71) Applicant: VisionNav Robotics USA Inc., Acworth, GA (US)

(72) Inventors: Feng Zhang, Acworth, GA (US); Yujie Lu, Acworth, GA (US); Fan Zheng, Acworth, GA (US)

(73) Assignee: VISIONNAV ROBOTICS USA INC., Acworth, GA (US)

( * ) Notice: Subject to any disclaimer, the term of this patent is extended or adjusted under 35 U.S.C. 154(b) by 0 days.

(21) Appl. No.: 19/242,484

(22) Filed: Jun. 18, 2025

(51) Int. Cl.
*G06T 7/73* (2017.01)
*G01C 21/00* (2006.01)
(Continued)

(52) U.S. Cl.
CPC .............. *G06T 7/74* (2017.01); *G01C 21/206* (2013.01); *G01C 21/3859* (2020.08);
(Continued)

(58) Field of Classification Search
CPC ... G06T 7/74; G06T 3/40; G06T 2207/10028; G06T 2207/30252; G06T 17/00; G06T 17/20; G06T 19/00; G06T 2207/10016; G06T 2207/10024; G06T 2207/30241; G06T 2207/30244; G06T 7/70; G06T 7/74; G01C 21/206; G01C 21/3859; G01C 21/20; G01C 21/3848; G01C 21/1656; G05D 1/246; G05D 2107/70; G05D 1/0238; G05D 1/024; G05D 1/0274; G05D 1/2464; G05D 1/639; G05D 1/6482; G05D 2107/40; G05D 2109/10; G01S 17/86; G01S 17/89; G01S 17/4808;
(Continued)

(56) References Cited

U.S. PATENT DOCUMENTS 11,629,964 B2 * 4/2023 Zhao ................... G01C 21/3848
701/26
11,662,738 B2 * 5/2023 Nakajima .............. G01C 21/20
701/28
(Continued)

FOREIGN PATENT DOCUMENTS

CN 117472058 A 1/2024

*Primary Examiner* — Jose L Couso
(74) *Attorney, Agent, or Firm* — MUNCY, GEISSLER, OLDS & LOWE, P.C.

(57) ABSTRACT

Provided are an autonomous mobile machine, a controller, and a control method. The autonomous mobile machine includes a controller executing program instructions to implement: driving a sensor to obtain a first current frame; retrieving an adjacent region corresponding to the first current frame according to a pose of the first current frame; determining whether the adjacent region is the same as an adjacent region corresponding to a previous frame; updating a region list stored in a first storage medium based on that the adjacent region corresponding to the first current frame is different from the adjacent region corresponding to the previous frame, wherein the region list records the adjacent region corresponding to the first current frame; and loading, from a second storage medium, a pose and point cloud data of a key frame corresponding to a newly added region in the region list into the first storage medium.

19 Claims, 13 Drawing Sheets

(51) Int. Cl.

| | |
|---|---|
| *G01C 21/20* | (2006.01) |
| *G05D 1/246* | (2024.01) |
| *G06T 3/40* | (2006.01) |
| *G05D 107/70* | (2024.01) |

(52) U.S. Cl.
CPC .............. *G05D 1/246* (2024.01); *G06T 3/40* (2013.01); *G05D 2107/70* (2024.01); *G06T 2207/10028* (2013.01); *G06T 2207/30252* (2013.01)

(58) Field of Classification Search
CPC ........ G01S 17/931; G01S 17/42; G01S 17/50; B60W 2420/408; B60W 60/001; G06V 20/56; G06V 10/16
See application file for complete search history.

(56) References Cited

U.S. PATENT DOCUMENTS

| | | | | |
|---|---|---|---|---|
| 12,055,947 | B1 * | 8/2024 | Sharma | ................... G05D 1/246 |
| 12,386,367 | B1 * | 8/2025 | Wei | ........................ G06V 20/56 |
| 2019/0226852 | A1 * | 7/2019 | Xie | ........................ G01C 21/20 |
| 2020/0225673 | A1 * | 7/2020 | Ebrahimi Afrouzi | ....................... A47L 11/4011 |
| 2021/0370968 | A1 * | 12/2021 | Xiao | ................... G01C 21/3848 |
| 2022/0222849 | A1 * | 7/2022 | Zhang | .................... G06T 17/00 |
| 2022/0254059 | A1 * | 8/2022 | Zhou | ......................... G06T 7/11 |
| 2022/0333162 | A1 * | 10/2022 | Clark | .................... C12Q 1/689 |
| 2024/0118419 | A1 * | 4/2024 | Yao | ......................... G01S 17/86 |
| 2025/0046164 | A1 * | 2/2025 | Zhang | ............. G08B 13/19602 |

\* cited by examiner

70

AUTONOMOUS MOBILE MACHINE, CONTROLLER, AND CONTROL METHOD FOR AUTONOMOUS MOBILE MACHINE

TECHNICAL FIELD

The present disclosure relates to the field of autonomous mobile machines, and specifically, to an autonomous mobile machine, a controller, and a control method for an autonomous mobile machine.

BACKGROUND

When an existing autonomous mobile machine is used for mapping and localization on a large-scale site, a single frame of point cloud has a large data volume and a computing unit used is limited in computing power and internal memory, which easily results in that real-time performance and program stability of mapping and localization cannot be ensured. As a result, an automated guided forklift relying on mapping and localization cannot operate normally.

BRIEF DESCRIPTION OF THE DRAWINGS

Accompanying drawings are intended to provide a further understanding of the present disclosure, and constitute a part of the specification. The accompanying drawings, together with the following specific implementations, are intended to explain the present disclosure, but do not constitute a limitation on the present disclosure. In the accompanying drawings.

DETAILED DESCRIPTION

Figure 1A:
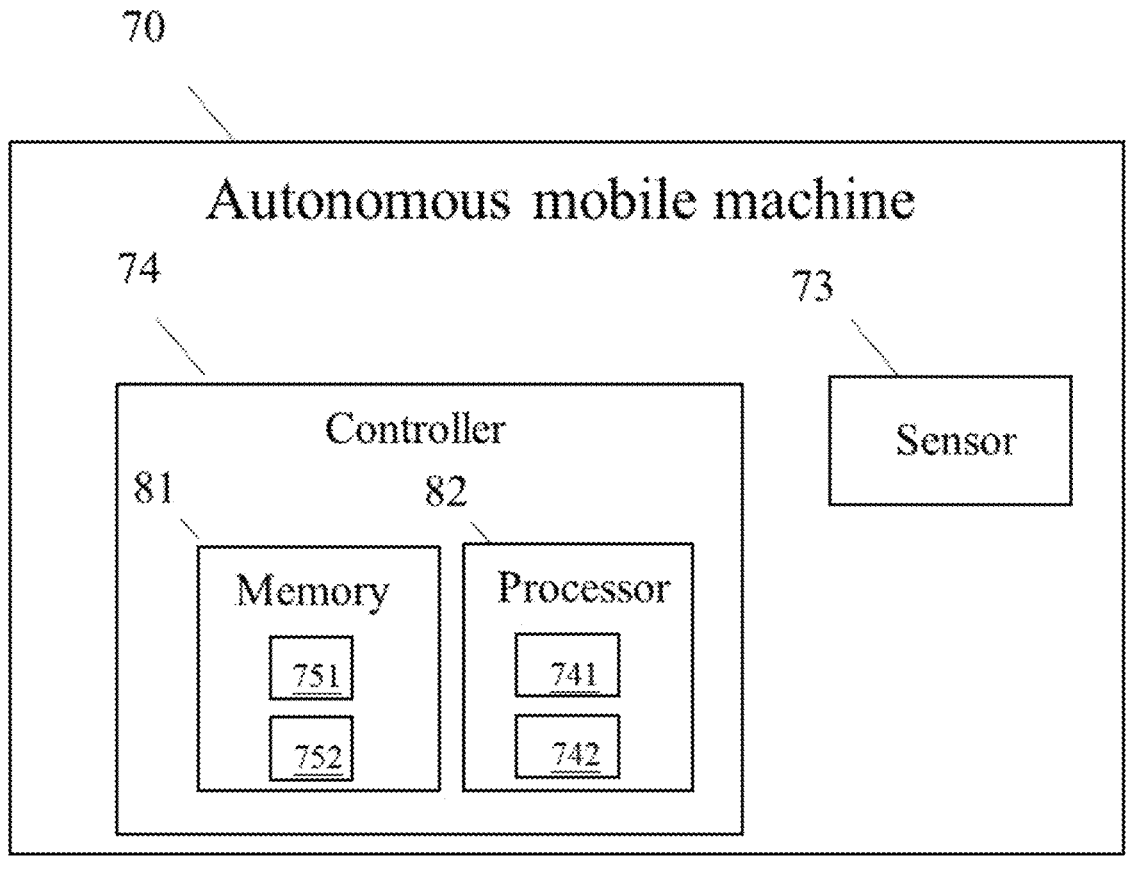
FIG. 1A is a schematic block diagram of an autonomous mobile machine according to an embodiment of the present disclosure.

The following disclosure provides a plurality of implementations or examples, which can be used to implement different features of the present disclosure. Specific examples of components and configurations described below are used to simplify the present disclosure. It may be conceived that these descriptions are merely for exemplary purposes, and are not intended to limit the present disclosure. For example, in the following description, that a first feature is formed on or above a second feature may include that in some embodiments, the first feature and the second feature are in direct contact with each other, or may include that, in some embodiments, an additional component is formed between the first feature and the second feature, so that the first feature and the second feature may not be in direct contact. In addition, in the present disclosure, component symbols and/or reference signs may be repeatedly used in a plurality of embodiments. The repeated use is based on an objective of brevity and clarity, and does not represent a relationship between different embodiments and/or configurations discussed.

Furthermore, spatially relative terms used herein, such as "below", "beneath", "lower than", "above", "over", and terms similar thereto, may be used for ease of describing a relationship between a component or feature shown in the figure and another or more components or features. These spatially relative terms are intended to cover a plurality of different orientations of an apparatus during use or operation in addition to the orientations shown in the figures. A device may be placed at another orientation (for example, rotated by 90° or at another orientation), and these spatially relative description terms should be correspondingly interpreted.

Although numerical ranges and parameters used to define the broad scope of the present disclosure are approximate values, relevant numerical values in specific embodiments are presented as precisely as possible herein. However, any numerical value essentially inevitably contains a standard deviation caused by an individual test method. Herein, "about" usually means that an actual numerical value is within plus or minus 10%, 5%, 1%, or 0.5% of a specific numerical value or range. Alternatively, the term "about" represents that an actual numerical value falls within an acceptable standard error of an average value, depending on considerations by a person of ordinary skill in the art to which the present disclosure belongs. It may be understood that, except experimental examples, or unless otherwise clearly stated, all ranges, quantities, numerical values, and percentages used herein (for example, for describing a material usage amount, a time length, a temperature, an operating condition, a quantity ratio, and the like) are modified by "about". Therefore, unless otherwise specified to the contrary, numerical parameters disclosed in this specification and appended claims are approximate numerical values, and may be changed according to requirements. These numerical parameters should be understood as at least significant digits indicated and numerical values obtained by using a general carry method. Herein, a numerical range is expressed as being from one endpoint to the other endpoint or between two endpoints. Unless otherwise specified, numerical ranges described herein include endpoints.

When an existing autonomous mobile machine performs mapping and localization on a large-scale site, a data volume of a single frame of point cloud is large and a computing unit used is limited in computing power and internal memory, which easily results in that real-time performance and program stability of mapping and localization cannot be ensured. As a result, the autonomous mobile machine relying on mapping and localization cannot operate normally.

In view of this, the present disclosure provides an autonomous mobile machine, a controller, and a control method for an autonomous mobile machine to solve the above-mentioned problem. By the technical solutions provided in the present disclosure, efficient reading and writing and real-time loading of a large-scale point cloud map can be implemented. In the technical solutions provided in the present disclosure, efficiency of interaction between a memory unit and a disk unit is improved in a manner such as map rasterization, map preloading, and double-layer pyramid point cloud downsampling, thereby expanding a storage space of the point cloud map by the disk unit, and enabling a mapping mode and a localization mode of the autonomous mobile machine to run in real time in a large-scale scenario. In the technical solutions provided in the present disclosure, efficiency of a relocalization technology that relies on a point cloud map feature is improved in an efficient read-write manner after a map feature is two-dimensionally processed. In addition, stored data can also provide offline diagnosis data and algorithm iteration data for mapping and localization. In the technical solutions provided in the present disclosure, original point cloud data is further encoded/decoded through a specific point cloud data format, thereby implementing efficient reading and writing of the point cloud map and extremely low storage space occupation. FIG. 1A is a schematic block diagram of an autonomous mobile machine 70 according to an embodiment of the present disclosure. In some embodiments, the autonomous mobile machine 70 includes a sensor 73 and a controller 74. In some embodiments, the controller 74 includes a memory 81 and a processor 82. In some embodiments, the processor 82 is operatively coupled to the memory 81. In some embodiments, the processor 82 may be an integrated element. The processor 82 may include a plurality of processing units. The processor 82 may include a computing unit or a core computing unit. The processor 82 may be configured to load data information from the memory 81. The processor 82 may store the data information into the memory 81. The processor 82 can receive data from another hardware device. The processor 82 can process the data from the another hardware device.

In some embodiments, the controller 74 is configured to execute program instructions to perform the control method according to the present disclosure. In some embodiments, the processor 82 in the controller 74 cooperates with the sensor 73 and the memory 81 to implement the control method according to the present disclosure.

In some embodiments, the processor 82 includes a mapping processing unit 741 and a localization processing unit 742. The mapping processing unit 741 is configured to process a mapping task, and the localization processing unit 742 is configured to process a localization task. In some embodiments, the processor 82 may further include another processing unit to separately process other tasks, for example, but not limited to, region establishment and region retrieval.

In some embodiments, the memory 81 may be an integrated element. The memory 71 may be considered as including a plurality of storage units. Data such as, but not limited to, a point cloud, a path, a pose, and a key frame may be respectively stored in different storage units or stored in a same storage unit. In some embodiments, the memory 71 includes a first storage medium 751 and a second storage medium 752. In some embodiments, the first storage medium 751 and the second storage medium 752 are storage media of different types. In some embodiments, the first storage medium 751 may be a random access memory, and the second storage medium 752 may be a read-only memory (such as a magnetic disk).

In some embodiments, the sensor 73 is an integrated element. The sensor 73 may be considered as including a plurality of sensor elements.

Figure 1B:
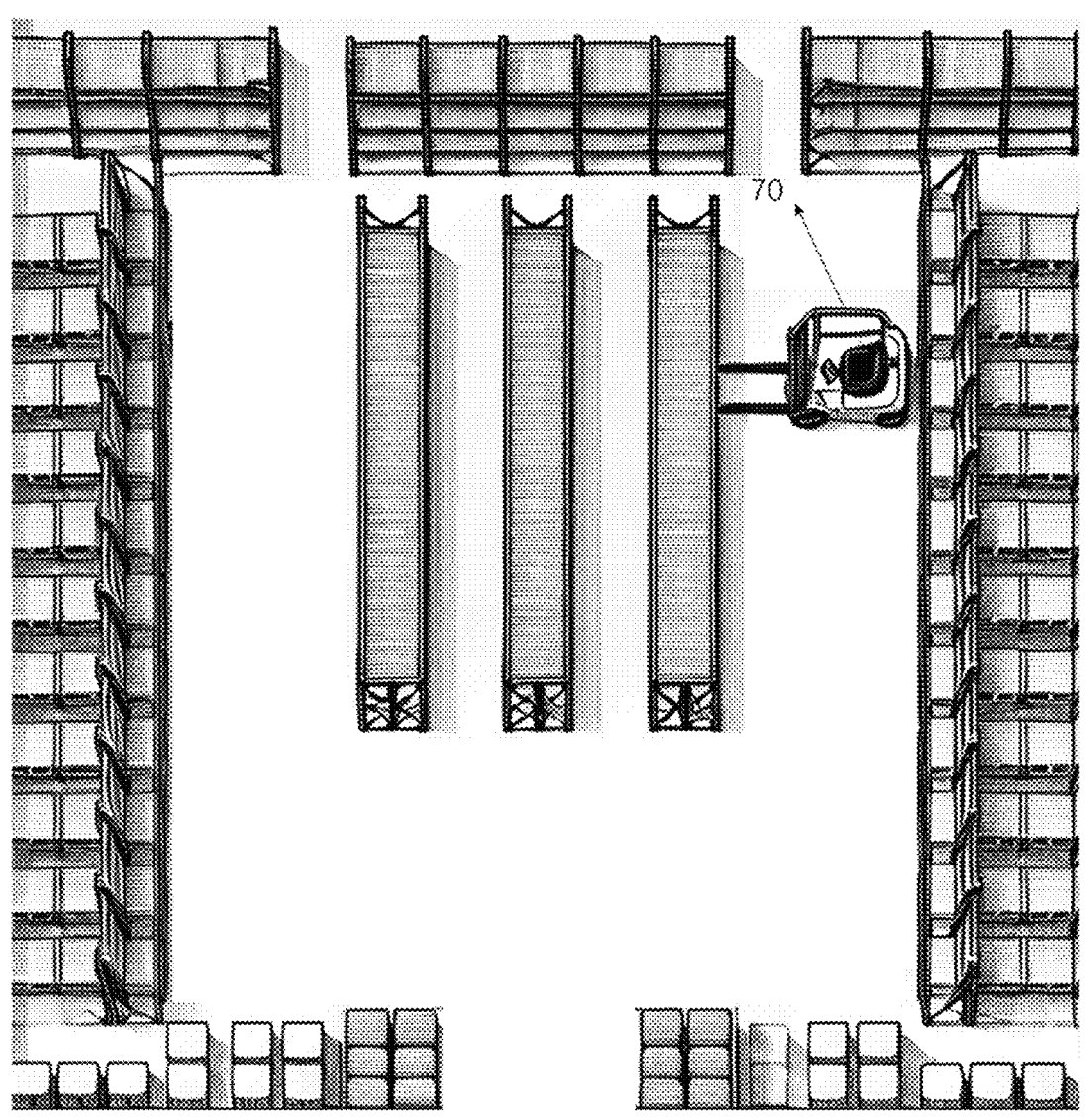
FIG. 1B is a schematic diagram showing that an autonomous mobile machine is applied to a warehouse according to an embodiment of the present disclosure.

In some embodiments, the autonomous mobile machine 70 is a mobile machine that can autonomously or semiautonomously execute a task, and common forms include: an automatic guided vehicle (AGV), an autonomous mobile robot (AMR), a humanoid robot, and the like, and may also include other forms such as an intelligent vehicle and a robot vacuum cleaner. The autonomous mobile machine 70 in the embodiment of FIG. 1A may be an autonomous mobile machine applied to a warehouse. Referring to FIG. 1B, FIG. 1B is a schematic diagram showing that an autonomous mobile machine 70 is applied to a warehouse according to an embodiment of the present disclosure. The autonomous mobile machine 70 may pick up goods from a warehouse region according to an instruction, accurately place the goods at a specified location, and implement dynamic path planning through real-time data under cooperation between the sensor 73 and the processor 82 and the memory 81, thereby avoiding collision and improving operation efficiency. It should be noted that the aspect of the autonomous mobile machine 70 shown in FIG. 1B is merely used for exemplary description, and is not a limitation on the present disclosure. In another embodiment, the autonomous mobile machine 70 may be any intelligent mobile apparatus. In subsequent embodiments, the autonomous mobile machine 70 shown in FIG. 1A is used as an example for description.

Figure 2A:
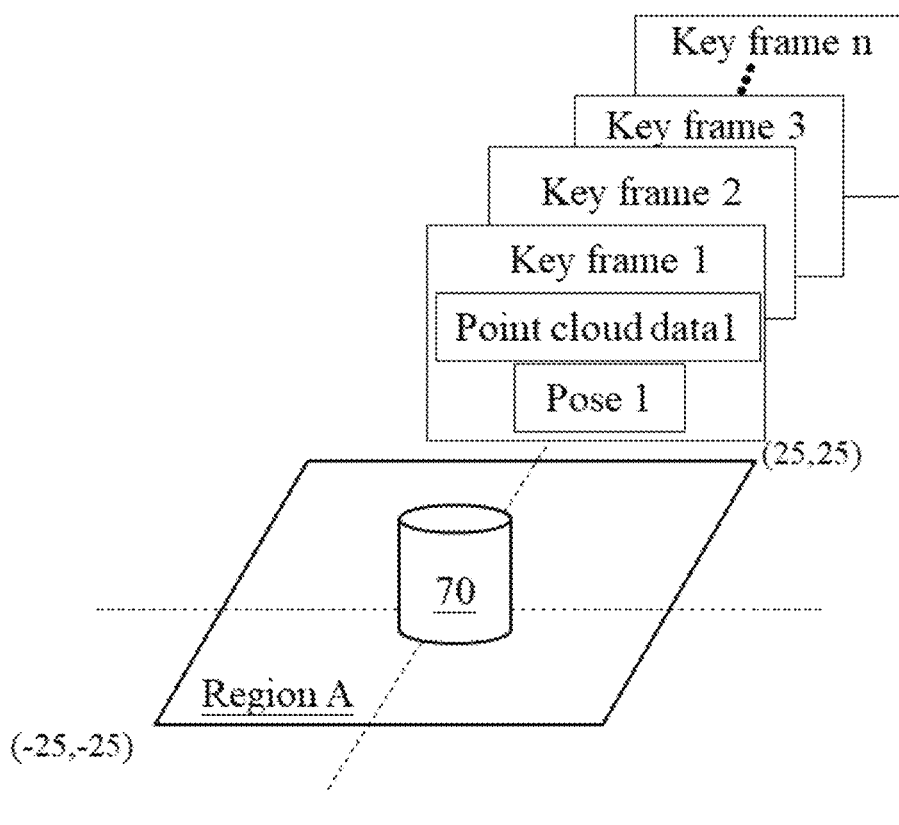
FIG. 2A to FIG. 2C are schematic diagrams of region establishment according to an embodiment of the present disclosure.
Figure 2B:
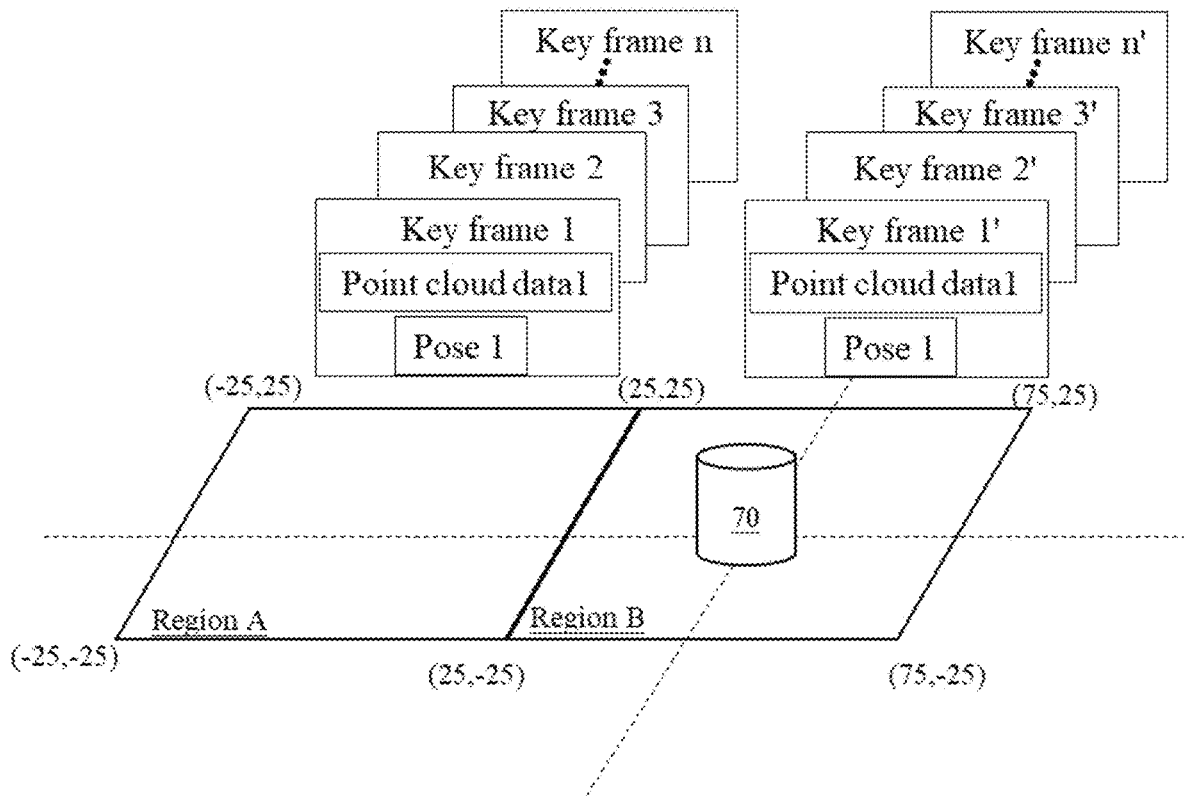
Figure 2C:
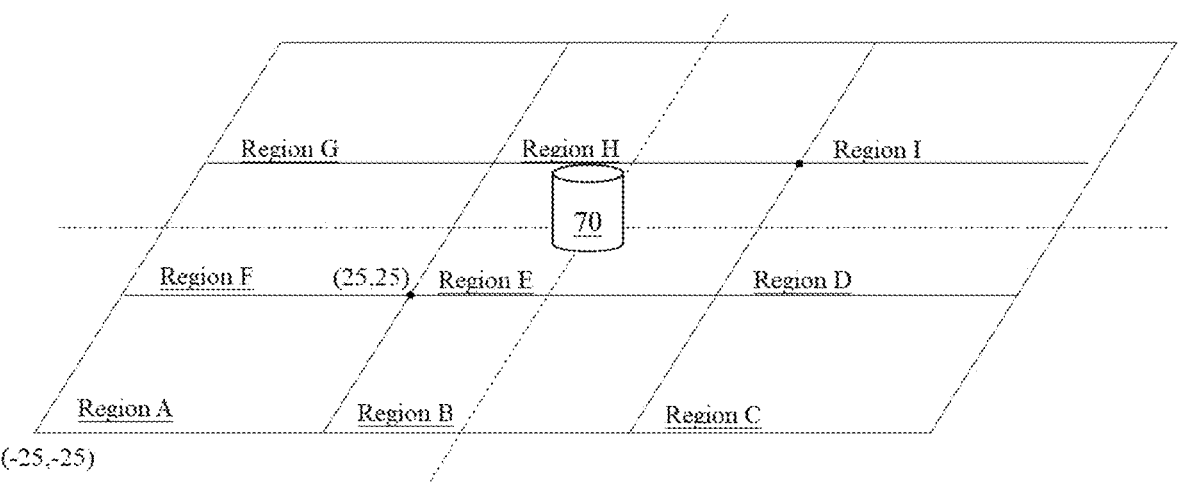

To improve efficiency of reading, writing, and loading a point cloud map, in the control method according to the present disclosure, map rasterization is first performed on a global map. In some embodiments, map rasterization is synchronously performed in a mapping process. Referring to FIG. 2A to FIG. 2C, FIG. 2A to FIG. 2C are schematic diagrams of region establishment according to an embodiment of the present disclosure. As shown in FIG. 2A, when an autonomous mobile machine 70 obtains a first frame by a sensor 73, a processor 82 first creates a two-dimensional region, which is named as a region A. In some embodiments, when the region A is created, the first frame obtained by the sensor 73 is directly considered as a key frame 1. The region A is represented by two-dimensional coordinates at a lower left corner and an upper right corner. The key frame 1 is a key frame with a sequence number being 1 in the region A. When the autonomous mobile machine 70 obtains a key frame 2 during movement, if the processor 82 determines that the key frame 2 still belongs to the existing region A, the key frame 2 is added to a key frame list corresponding to the region A. When the autonomous mobile machine 70 successively obtains, during the movement, key frames 3, 4, . . . n−1, and n, which are all in the region A, the key frames 3 to n are added to the key frame list corresponding to the region A. The processor 82 stores the key frame list corresponding to the region A into the first storage medium 751 and the second storage medium 752.

Next, as shown in FIG. 2B, the autonomous mobile machine 70 obtains an $n^{th}$ frame by the sensor 73 during movement. If the processor 82 determines according to the $n^{th}$ frame that the autonomous mobile machine 70 is not in the region A, a new region is created and is named as a region B. The region B is adjacent to the region A. Because the $n^{th}$ frame is the first frame obtained by the sensor 73 when the region B is created, the $n^{th}$ frame is directly considered as a key frame 1'. The key frame 1' is a key frame with a sequence number being 1 in the region B. Similarly, when the autonomous mobile machine 70 obtains a key frame 2' during movement, if the processor 82 determines that the key frame 2' is still in the existing region B, the key frame 2' is added to a key frame list corresponding to the region B. When the autonomous mobile machine 70 successively obtains, during the movement, key frames 3', 4', . . . , (n−1)', and n', which are all in the region B, the key frames 3' to n' are added to the key frame list corresponding to the region B. The processor 82 stores the key frame list corresponding to the region B into the first storage medium 751 and the second storage medium 752.

Next, as shown in FIG. 2C, the autonomous mobile machine 70 continuously creates regions according to the foregoing steps, until a region A to a region I of a global environment map are all established, thereby implementing map rasterization. In addition, establishment of the global environment map is completed. Key frame lists of the region A to the region I are all stored in the first storage medium 751 and the second storage medium 752. In some embodiments, the region A to the region I represent a global map of the warehouse shown in FIG. 1B.

In some embodiments, adjacent regions are defined as regions except a region in which the autonomous mobile machine 70 is located, which are immediately adjacent to the region around the region with the region as a center of a nine-block box. With a region E as an example, adjacent regions of the region E are regions except the region E, which are immediately adjacent to the region E around the region E with the region E as a center, namely a region A, a region B, a region C, a region D, a region F, a region G, a region H, and a region I. If a region is at an edge or a corner of an entire environment, for example, a region A, adjacent regions of the region A are regions except the region A, which are immediately adjacent to the region A around the region A, for example, a region B, a region E, and a region F. During creation of a region, as the autonomous mobile machine 70 moves, adjacent regions corresponding to the region in which the autonomous mobile machine is located are all stored into a region list of the first storage medium 751.

In some embodiments, the region A to the region I may have the same shape and size. In some embodiments, each of the region A to the region I may have an area of 50 unit sizes*50 unit sizes. For example, coordinates of four corners of the region A may be respectively denoted as (25,25), (−25,25), (−25,−25), and (25,−25) to divide a range of the region A, coordinates of four corners of the region B may be respectively denoted as (75,25), (25,25), (25,−25), and (75,−25) to divide a range of the region B, and so on.

Figure 3A:
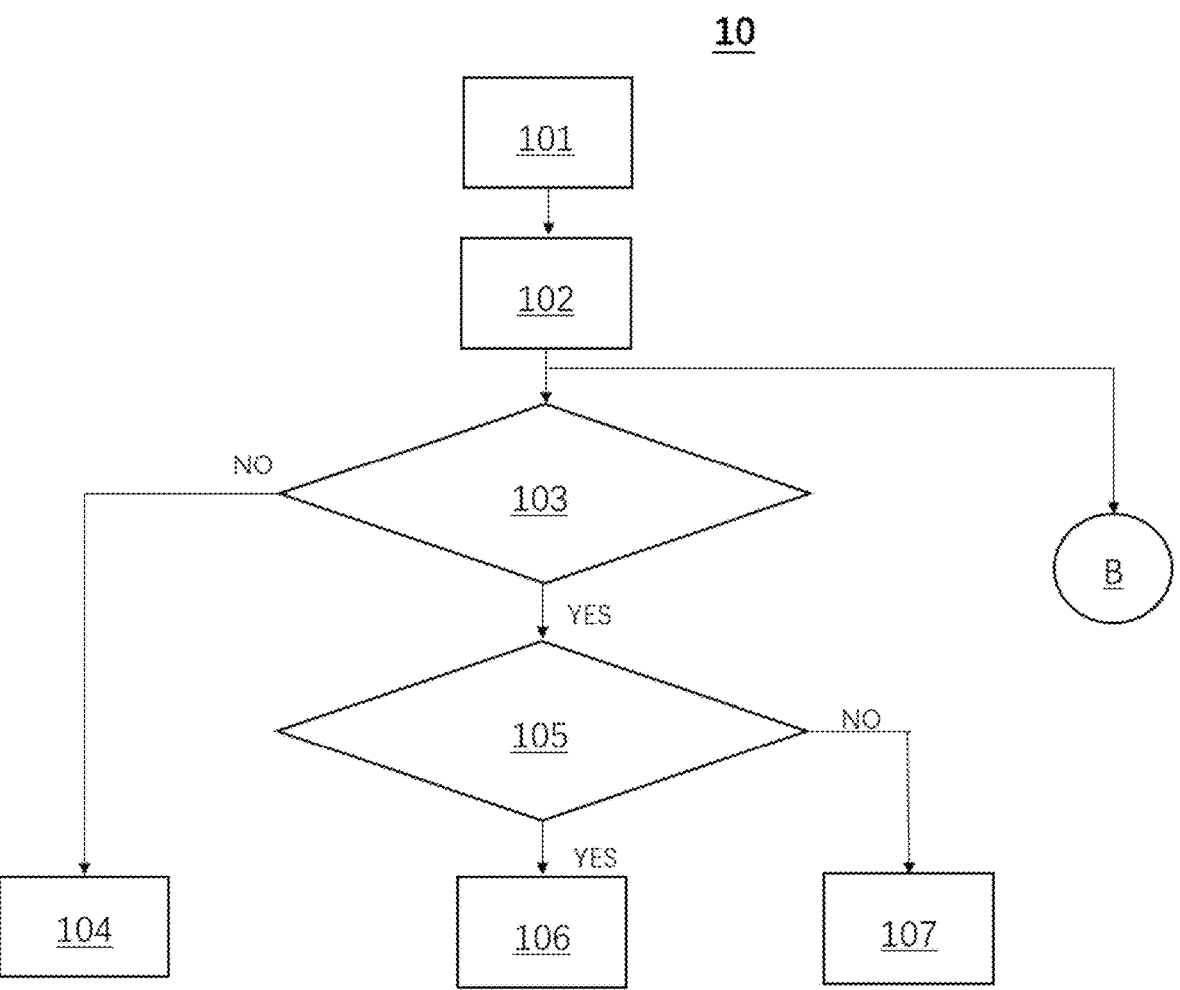
FIG. 3A is a flowchart of a first part of a control method according to an embodiment of the present disclosure.

In some embodiments, a region creation scheme and the mapping mode may be synchronously performed. In other words, the autonomous mobile machine 70 operates in the mapping mode while creating a region. Referring to FIG. 3A, FIG. 3A is a flowchart of a first part of a control method 10 according to an embodiment of the present disclosure. If approximately the same result can be obtained, the present disclosure is not limited to being executed completely according to the flow steps shown in FIG. 3A. The control method 10 may be applied to the autonomous mobile machine 70 shown in FIG. 1A. In some embodiments, the steps of the control method 10 may be performed by different control units/processing units in a processor 82 or by the same control unit/processing unit. The first part of the control method 10 is an embodiment in which the autonomous mobile machine 70 operates in a mapping mode while a region is created. In some embodiments, the control method 10 may include step 101, step 102, step 103, step 104, step 105, and step 106.

In some embodiments, in step 101, the processor 82 may drive a sensor 73 to obtain a second current frame in response to that the autonomous mobile machine 70 operates in a mapping mode. In some embodiments, in step 102, the processor 82 may generate point cloud data of the second current frame. In some embodiments, in step 103, the processor 82 may determine whether the second current frame is in an existing region according to a pose and point cloud data of the second current frame, and if not, step 104 is performed, or if so, step 105 is performed. In some embodiments, in step 104, the processor 82 may create a new region. In some embodiments, in step 105, the processor 82 may determine whether region data that is in a first storage medium 751 and that is not of an adjacent region exists in a second storage medium 752, and if so, step 106 is performed, otherwise step 107 is performed. In some embodiments, in step 106, the processor 82 may delete the region data that is in the first storage medium 751 and that is not of the adjacent region. In some embodiments, in step 107, the processor 82 may store the region data that is in the first storage medium 751 and that is not of the adjacent region into the second storage medium 752.

For detailed descriptions of step 101 to step 104, reference may be made to the embodiments of FIG. 2A and FIG. 2B, and details are not described herein. Steps 105 to 107 may be described with reference to the embodiment in FIG. 2C. If the autonomous mobile machine 70 leaves a region B to enter a region A again, adjacent regions recorded in a region list are updated from the region A, the region B, a region C, a region D, a region E, and a region F to the region A, the region B, the region E, and the region F. Accordingly, the processor 82 determines that the region C and the region D are not current adjacent regions. Next, the processor 82 compares region data (poses and point cloud data of key frames) of the region C and the region D that is currently stored in the first storage medium 751 with region data of the region C and the region D that is stored in the second storage medium 752. If the region data (poses and point cloud data of key frames) of the region C and the region D that is stored in the first storage medium 751 is newly added compared with the region data of the regions C and D that is stored in the second storage medium 752, the newly added poses and point cloud data of the key frames of the region C and the region D in the first storage medium 751 are written into the second storage medium 752, and poses and point cloud data of key frames of the regions C and D in the first storage medium 751 are cleared if there is no newly added region data.

Figure 3B:
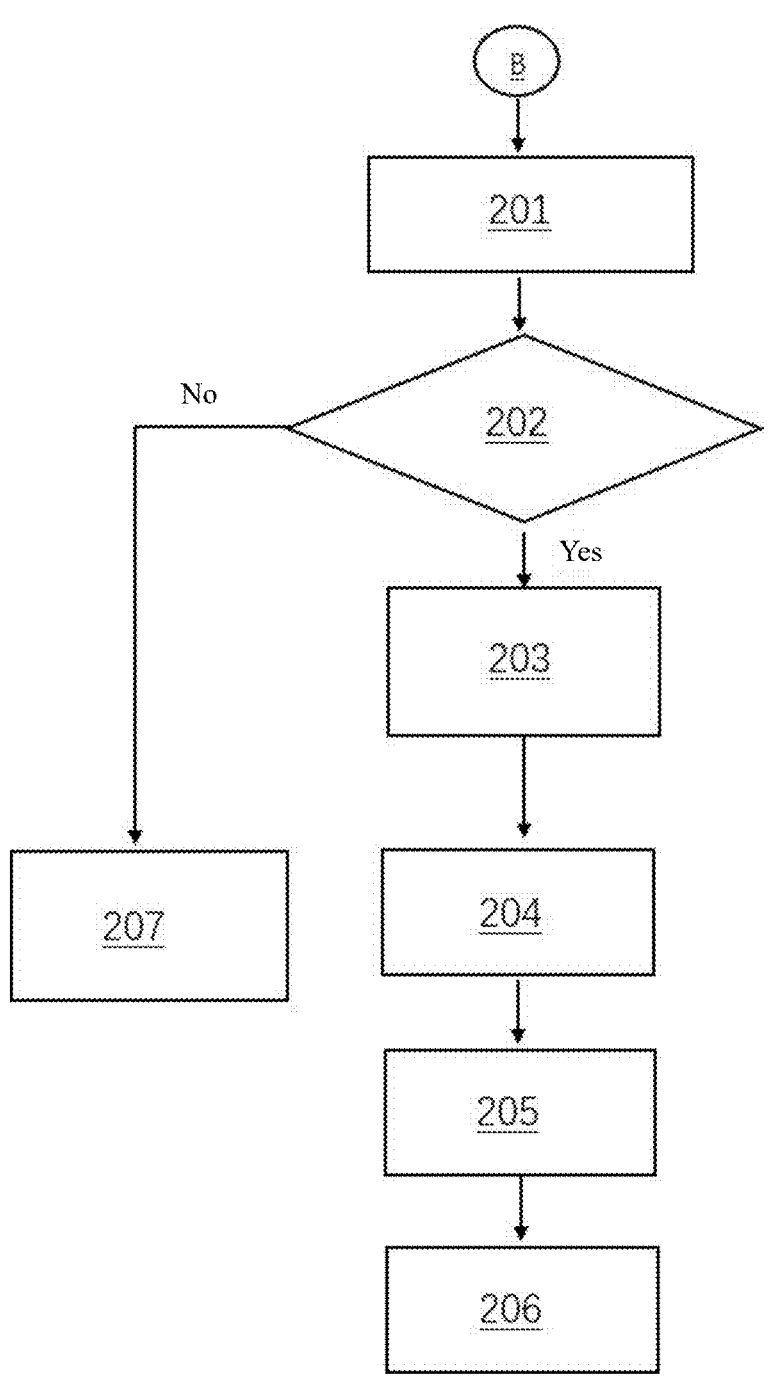
FIG. 3B is a flowchart of a second part of a control method according to an embodiment of the present disclosure.

FIG. 3B is a flowchart of a second part of a control method 10 according to an embodiment of the present disclosure. If approximately the same result can be obtained, the present disclosure is not limited to being executed completely according to the flow steps shown in FIG. 3B. A flow of the second part shown in FIG. 3B continues from step 102 in FIG. 3A. In some embodiments, the control method 10 may further include step 201.

Figure 4:
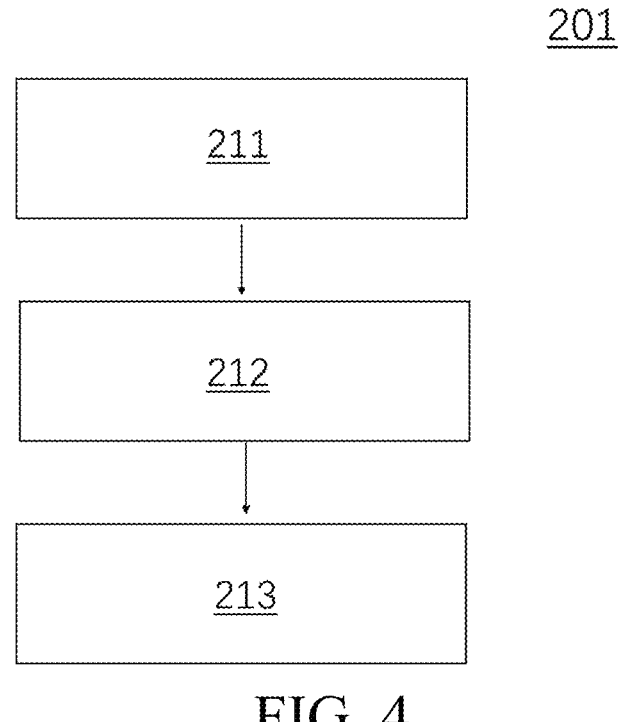
FIG. 4 is a flowchart of a third part of a control method according to an embodiment of the present disclosure.

In some embodiments, in step 201, the processor 82 may match the second current frame with the region data of the adjacent regions listed in the region list in the first storage medium 751. For detailed description of step 201, reference may be made to FIG. 4. FIG. 4 shows a method flow of step 201 according to an embodiment of the present disclosure. If approximately the same result can be obtained, the present disclosure is not limited to being executed completely according to the flow steps shown in FIG. 4. In some embodiments, step 201 may include step 211, step 212, and step 213.

In some embodiments, in step 211, the processor 82 may register the second current frame with a previous frame thereof by an algorithm, so that the second current frame and the previous frame thereof are aligned in a same coordinate system, to minimize an error between two frames of point clouds. In some embodiments, in step 212, the processor 82 may convert the second current frame into a same coordinate system as the region data of the adjacent region. In some embodiments, in step 213, the processor 82 may match the second current frame with point cloud data of a nearest key frame.

Referring to FIG. 3B again, in some embodiments, the control method 10 may further include step 202, step 203, step 204, step 205, step 206, and step 207.

In some embodiments, in step 202, the processor 82 may determine whether the second current frame is a key frame, and if so, step 203 is performed, otherwise, step 207 is performed. In some embodiments, in step 203, the processor 82 may store a pose and point cloud data of the second current frame into a corresponding region in the first storage medium 751. In some embodiments, in step 204, the processor 82 may downsample the point cloud data of the second current frame. In some embodiments, in step 205, the processor 82 may generate a point cloud map feature description, where the point cloud map feature description is a mathematical or abstract representation that is extracted from original point cloud data and that can efficiently represent an environment structure or key information. In some embodiments, in step 206, the processor 82 may store the point cloud map feature description into the second storage medium 752. In some embodiments, in step 207, the processor 82 may match the second current frame with the region data of the adjacent region, and output the pose of the second current frame.

Figure 5:
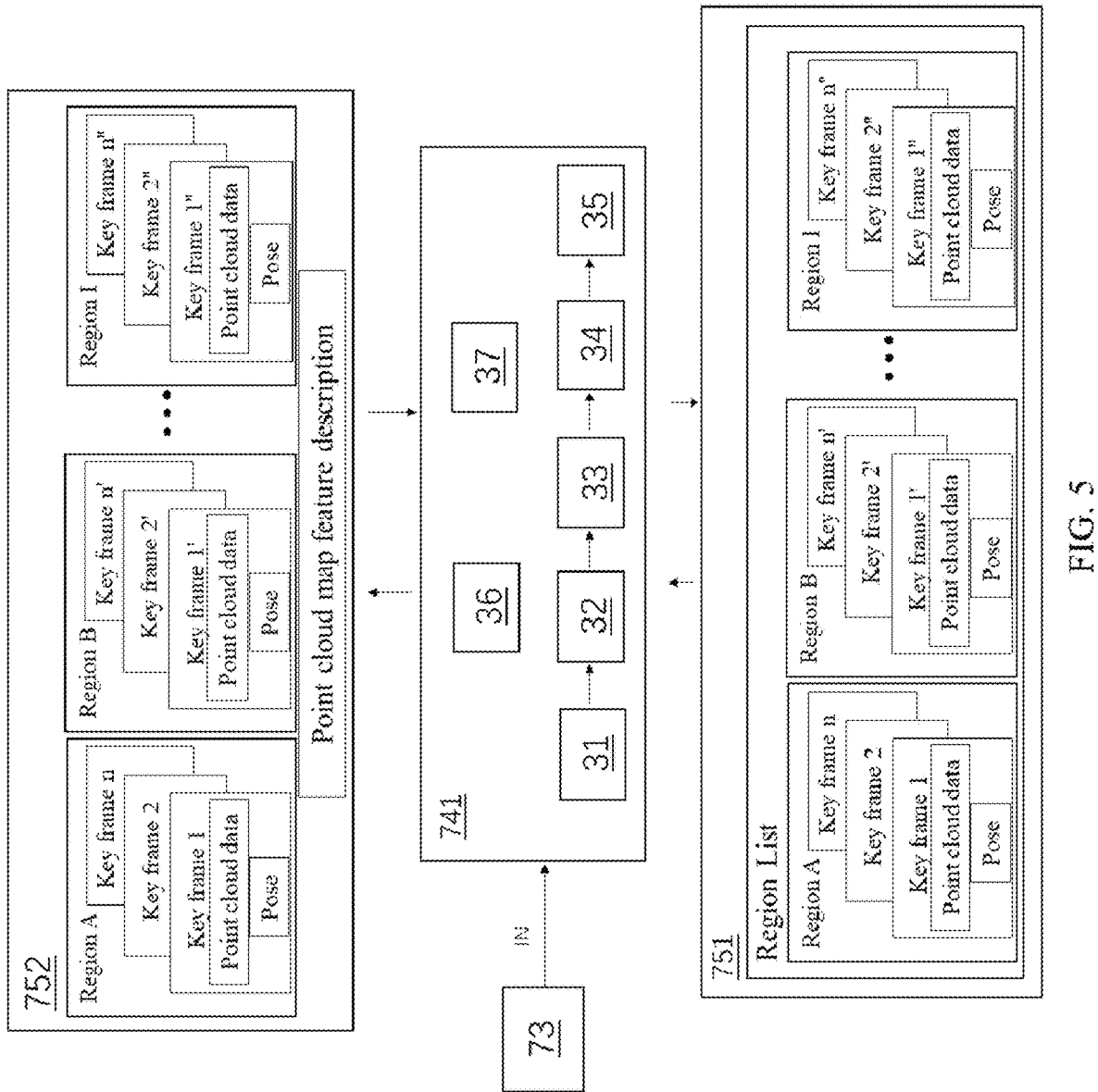
FIG. 5 shows a method flow of step 201 according to an embodiment of the present disclosure.

For descriptions about the autonomous mobile machine 70 operating in a mapping mode, reference may be made to FIG. 3B and FIG. 5. FIG. 5 is a schematic diagram of operations of a mapping processing unit 741 according to an embodiment of the present disclosure. In some embodiments, the mapping processing unit 741 receives sensed frame information IN from the sensor 73. In some embodiments, the mapping processing unit 741 includes a preprocessing module 31, an interframe matching module 32, a coordinate system conversion module 33, a map matching module 34, a determining module 35, a downsampling module 36, and a point cloud map characterization module 37.

In some embodiments, the preprocessing module 31 is configured to perform step 102. In some embodiments, the preprocessing module 31 is configured to process the received frame information IN. In some embodiments, the preprocessing module 31 performs near-range point cloud filtering on original point cloud data of the frame information IN to generate unobstructed point cloud data. In some embodiments, the preprocessing module 31 may further downsample an unobstructed point cloud at least once to generate sparse point cloud data.

In some embodiments, the interframe matching module 32 is configured to perform step 211. In some embodiments, the interframe matching module 32 is configured to register the second current frame with a previous frame thereof by an algorithm, so that the second current frame and the previous frame thereof are aligned in a same coordinate system, to minimize an error between two frames of point clouds.

In some embodiments, the coordinate system conversion module 33 is configured to perform step 212. In some embodiments, the coordinate system conversion module 33 is configured to convert the second current frame into a same coordinate system as region data of an adjacent region or a current region in which the second current frame is located. In some embodiments, the map matching module 34 is configured to perform step 213. In some embodiments, the map matching module 34 is configured to match the second current frame with point cloud data of a closest key frame.

In some embodiments, the determining module 35 is configured to perform step 202. In some embodiments, the determining module 35 is configured to determine whether the second current frame is a key frame. As described in the embodiment of FIG. 2B, when the second current frame is not in an existing region, that is, in response to creating a new region, the processor 82 directly considers the second current frame as a key frame, in step 202, the determining module 35 determines that the second current frame is a key frame. In some embodiments, the downsampling module 36 is configured to perform step 204. In some embodiments, the downsampling module 36 is configured to downsample a point cloud of each key frame. In some embodiments, the point cloud map characterization module 37 is configured to perform step 205. In some embodiments, the point cloud map characterization module 37 is configured to generate a point cloud map feature description based on the downsampled point cloud of the key frame.

In the control method 10 according to the present disclosure, when the autonomous mobile machine 70 operates in the mapping mode, a pose of a key frame may be accessed in the first storage medium 751 in real time. As described in the embodiment of FIG. 3A, when the processor 82 determines that the autonomous mobile machine 70 moves to a relatively distant region, the processor 82 stores newly added poses and point cloud data of key frames into the second storage medium 752, and deletes existing poses and point cloud data of key frames, thereby saving space of the first storage medium 751. When the autonomous mobile machine 70 moves to the vicinity of a pose of a key frame that is stored in the second storage medium 752, the processor 82 preloads point cloud data of the key frame. During mapping, the processor 82 downsamples a point cloud of each key frame to generate a point cloud map feature description, and stores the point cloud map feature description into the second storage medium 752. In the control method 10 according to the present disclosure, when the autonomous mobile machine 70 operates in the mapping mode, real-time point cloud storage and loading can ensure that only partial map data of a current location needs to be obtained for mapping, thereby greatly reducing occupation of an internal memory and a computing unit, to implement a large-scale map.

After map rasterization and mapping are completed, when the autonomous mobile machine 70 operates in the localization mode subsequently, the autonomous mobile machine 70 may first perform region retrieval based on the created region, to determine a map of a current region in which the autonomous mobile machine is located, and perform localization with reference to a rasterized map. In this way, efficiency of reading, writing, and loading a point cloud map can be effectively improved.

Figure 6A:
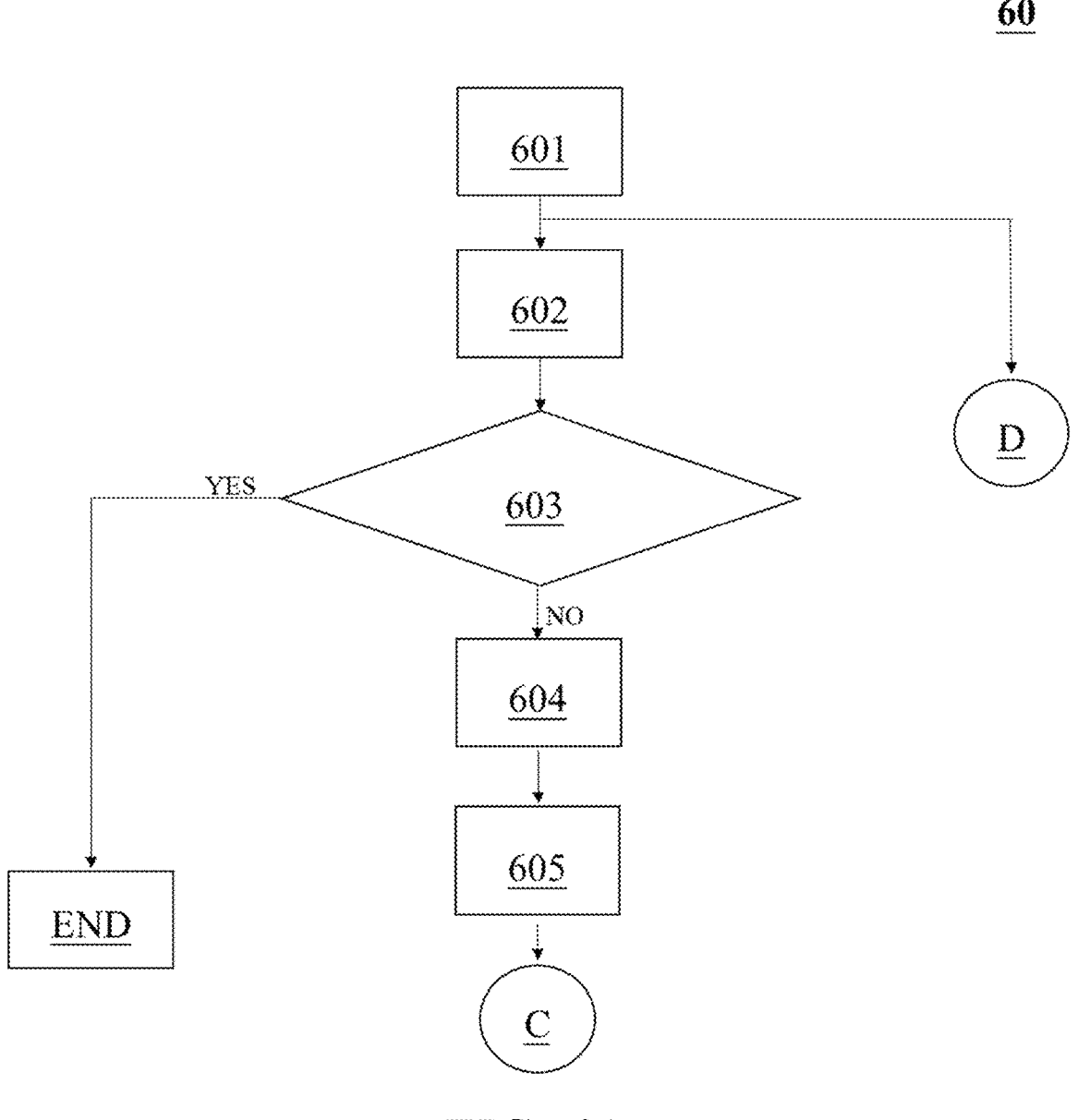
FIGS. 6A and 6B are a schematic diagrams of operations of a mapping processing unit according to an embodiment of the present disclosure.

Referring to FIG. 6A, FIG. 6A is a flowchart of a first part of a control method 60 according to an embodiment of the present disclosure. If approximately the same result can be obtained, the present disclosure is not limited to being executed completely according to the flow steps shown in FIG. 6A. The control method 60 may be applied to the autonomous mobile machine 70 shown in FIG. 1A. In some embodiments, the steps of the control method 60 may be performed by different control units/processing units in a processor 82 or by the same control unit/processing unit. The first part of the control method 60 is an embodiment in which the autonomous mobile machine 70 operates in a localization mode after map rasterization is implemented and establishment of a global environment map is completed. In some embodiments, the control method 20 may include step 601, step 602, step 603, step 604, and step 605.

In some embodiments, in step 601, the processor 82 may drive a sensor 73 to obtain a first current frame. In some embodiments, in step 602, the processor 82 may retrieve an adjacent region corresponding to the first current frame according to a pose of the first current frame. In some embodiments, in step 603, the processor 82 may determine whether the adjacent region corresponding to the first current frame is the same as an adjacent region corresponding to a previous frame of the first current frame, and if so, the first part of the control method 60 is ended, otherwise, step 604 is performed. In some embodiments, in step 604, the processor 82 may update a region list stored in a first storage medium 751. In some embodiments, in step 605, the processor 82 may load, from a second storage medium 752, a pose and point cloud data of a key frame corresponding to a newly added region in the region list into the first storage medium 751.

Step 602 to step 605 may be described with reference to the embodiment in FIG. 2C. When the autonomous mobile machine 70 is in a region A, adjacent regions listed in the region list in the first storage medium 751 are the region A, a region B, a region E, and a region F. Next, when the autonomous mobile machine 70 obtains a frame after moving, a pose of the frame is retrieved and compared with those of key frames of adjacent regions, namely the region A, the region B, the region E, and the region F. If after comparison, the processor 82 determines that the autonomous mobile machine 70 has moved from the region A to the region B, the adjacent regions listed in the region list in the first storage medium 751 are updated to the region A, the region B, a region C, a region D, the region E, and the region F. Because the region C and the region D are newly added to the region list in the first storage medium 751, the processor 82 loads poses and point cloud data of key frames of the region C and the region D from the second storage medium 752 to the first storage medium 751, for subsequent retrieval and comparison.

Figure 6B:
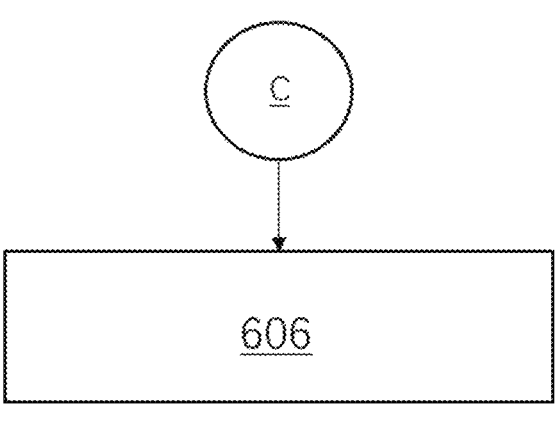

Next, referring to FIG. 6B, FIG. 6B is a flowchart of a second part of a control method 60 according to an embodiment of the present disclosure. If approximately the same result can be obtained, the present disclosure is not limited to being executed completely according to the flow steps shown in FIG. 6B. A flow of the second part shown in FIG. 6B continues from step 606 in FIG. 6A. In some embodiments, the control method 10 may further include step 606.

In some embodiments, in step 606, the processor 82 may delete the region data that is in the first storage medium 751 and that is not of the adjacent region. Step 107 may be described with reference to the embodiment in FIG. 2C. After the autonomous mobile machine 70 leaves the region B to enter the region C, the processor 82 updates the adjacent regions listed in the region list in the first storage medium 751. The adjacent regions are changed from the region A, the region B, the region C, the region D, the region E, and the region F into the region B, the region C, the region D, and the region E. Therefore, the processor 82 determines that the region A and the region F are relatively distant regions. Next, poses and point cloud data of all key frames of the region A and the region F in the first storage medium 751 are cleared.

Figure 7:
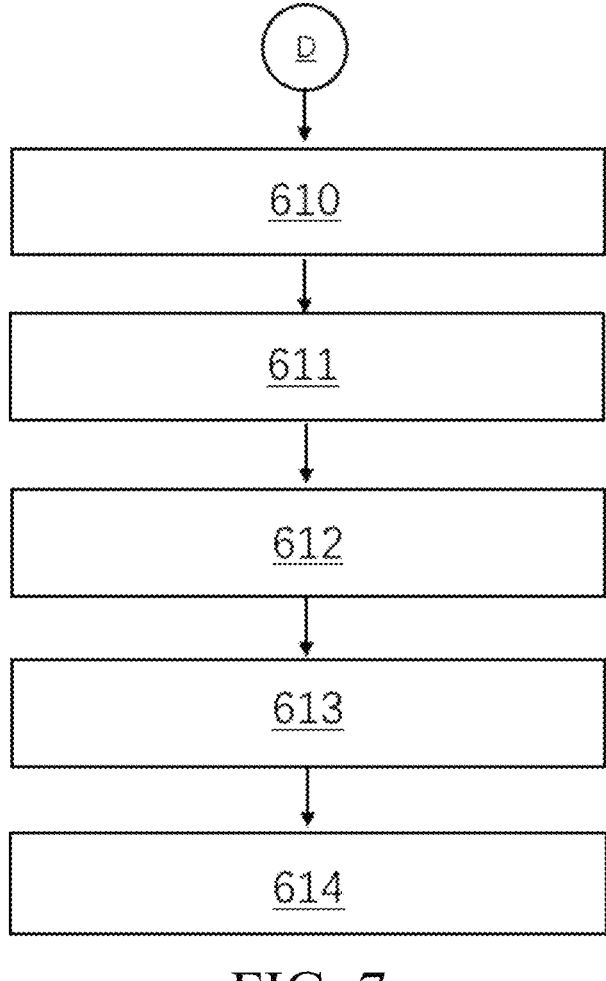
FIG. 7 is a flowchart of a third part of a control method according to another embodiment of the present disclosure.

Referring to FIG. 7, FIG. 7 is a flowchart of a third part of a control method 60 according to an embodiment of the present disclosure. If approximately the same result can be obtained, the present disclosure is not limited to being executed completely according to the flow steps shown in FIG. 7. A flow of the third part shown in FIG. 7 continues from step 601 in FIG. 6A. The flow of the third process in FIG. 7 and the flow of the second part shown in FIG. 6B may be performed simultaneously. In some embodiments, the flow of the third part shown in FIG. 7 shows a method flow when an autonomous mobile machine 70 operates in a localization mode. In some embodiments, the control method 60 may include step 610, step 611, step 612, step 613, and step 614.

In some embodiments, in step 610, a processor 82 may generate point cloud data of a first current frame. In some embodiments, in step 611, the processor 82 may load a point cloud map feature description of an adjacent region into a second storage medium 752. In some embodiments, in step 612, the processor 82 may compare a similarity between the first current frame and the point cloud map feature description according to a pose and point cloud data of the first current frame, to obtain an initial pose. In some embodiments, in step 613, the processor 82 may determine a pose and point cloud data of a nearest neighbor key frame from the first storage medium 751 according to the initial pose. In some embodiments, in step 614, the processor 82 may obtain localization of the autonomous mobile machine 70 according to the point cloud data of the first current frame and the pose and the point cloud data of the nearest neighbor key frame.

Figure 8:
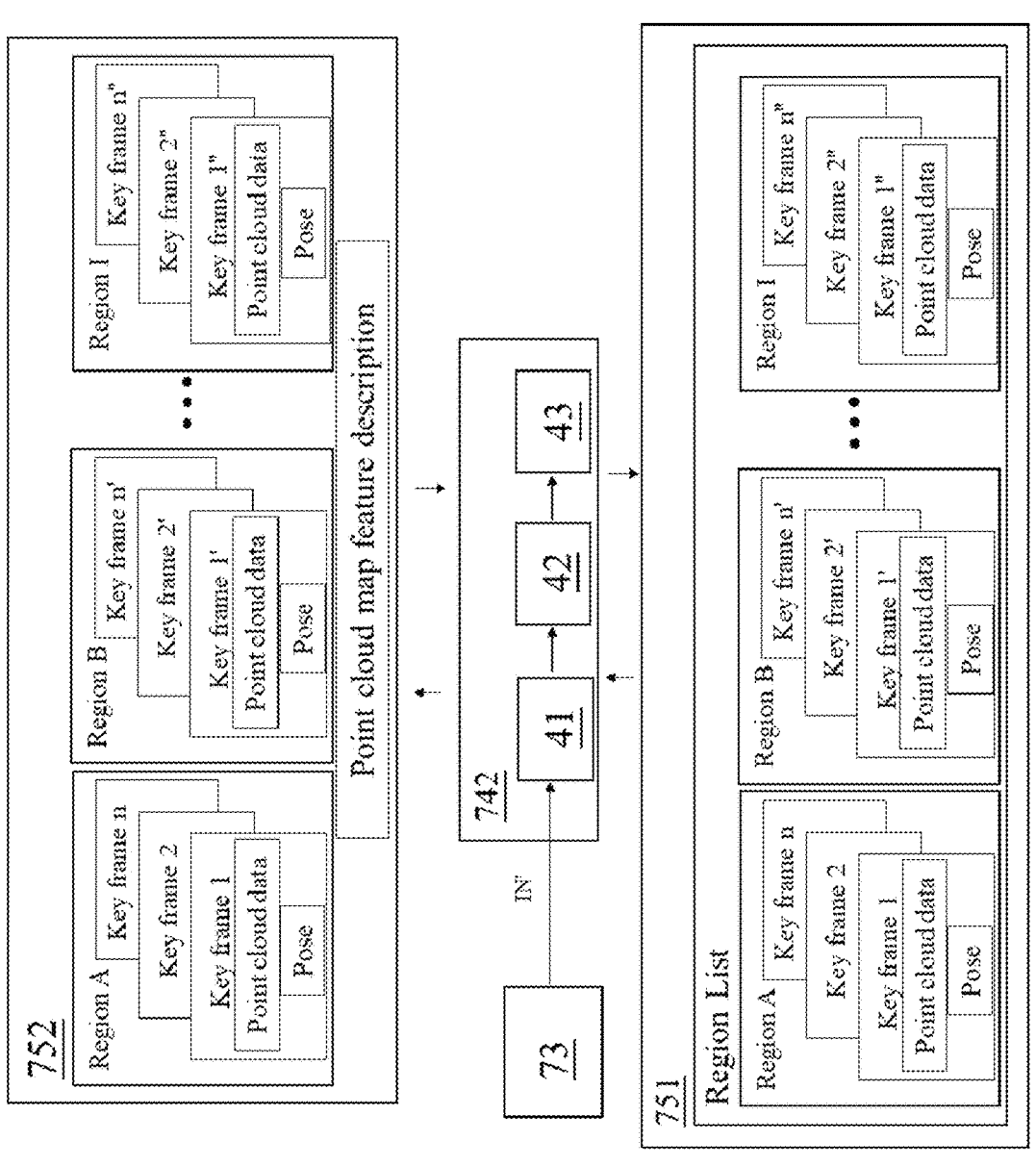
FIG. 8 is a schematic diagram of operations of a localization processing unit according to an embodiment of the present disclosure.

For descriptions about the autonomous mobile machine 70 operating in a localization mode, reference may be made to FIG. 7 and FIG. 8. FIG. 8 is a schematic diagram of operations of a localization processing unit 742 according to an embodiment of the present disclosure. In some embodiments, the localization processing unit 742 receives sensed frame information IN' from a sensor 73. In some embodiments, the localization processing unit 742 includes a preprocessing module 41, a relocalization module 42, and a localization module 43.

In some embodiments, the preprocessing module 41 is configured to perform step 602. In some embodiments, the preprocessing module 41 is configured to process the received frame information IN'. In some embodiments, the preprocessing module 41 performs near-range point cloud filtering on original point cloud data of the frame information IN' to generate unobstructed point cloud data. In some embodiments, the preprocessing module 41 may further downsample an unobstructed point cloud at least once to generate sparse point cloud data.

In some embodiments, the relocalization module 42 is configured to perform step 612. In some embodiments, the relocalization module 42 is configured to compare a similarity between the first current frame and the point cloud map description according to a pose and point cloud data of the first current frame, to obtain an initial pose. In some embodiments, the localization module 43 is configured to perform step 614. In some embodiments, the localization module 43 is configured to obtain localization of the autonomous mobile machine 70 according to the point cloud data of the first current frame and the pose and the point cloud data of the nearest neighbor key frame.

In the control method 60 according to the present disclosure, when the autonomous mobile machine 70 operates in the localization mode, the processor 82 reads point cloud map feature descriptions from the second storage medium 752, and determines an initial pose based on a similarity of the point cloud map feature descriptions. After the initial pose is obtained, the processor 82 loads local point cloud map data of an adjacent region in real time, and obtains global localization of the autonomous mobile machine 70 in a global map according to real-time point cloud data of the sensor 73 and the local point cloud map data. When the autonomous mobile machine moves away from an adjacent local point cloud map, a local point cloud map is automatically cleared from the first storage medium 751, thereby saving storage space and computing power of processing units.

When the autonomous mobile machine 70 operates in a mapping mode and a localization mode, valid data processed by the processor 82 includes original point cloud frame data, a point cloud frame pose, and a point cloud map feature. In some embodiments, the original point cloud frame data may include information such as a timestamp, a point cloud size, a sequence number, and point cloud data. The point cloud data may include information such as two-dimensional spatial coordinates, three-dimensional spatial coordinates, and reflectivity. In some embodiments, the point cloud frame pose may include information such as a timestamp, a sequence number, a position, and posture information. In some embodiments, the point cloud map feature may include information such as a key frame sequence number, a key frame feature descriptor, and a key frame two-dimensional feature descriptor. In some embodiments, when the processor 82 stores an original point cloud, a pose, and a point cloud map feature description into the second storage medium 752, the original point cloud, the pose, and the point cloud map feature description are first encoded by an encoder (not shown in the figure), to store the original point cloud, the pose, and the point cloud map feature description into a specific .dat format to further reduce time consumption for storage. When the processor 82 loads the original point cloud, the pose, and the point cloud map feature description, since a file in a .dat data format is loaded, time consumption is relatively low, thereby saving computing power of computing units. Next, an original point cloud data structure, a pose data structure, and a data structure of a point cloud map feature descriptor can be obtained through decoding by the encoder.

As used herein, the terms "approximately", "substantially", "basically", and "about" are used to describe and consider small variations. When used with reference to an event or a case, the terms may refer to an example in which the event or the case precisely occurs and an example in which the event or the case approximately occurs. As used herein with respect to a given value or range, the term "about" generally means within +10%, +5%, +1%, or ±0.5% of the given value or range. The range may be expressed herein as from one endpoint to the other endpoint or between two endpoints. All ranges disclosed herein include endpoints unless otherwise specified. The term "substantially coplanar" may refer to two surfaces that are located along a same plane and are within a few micrometer (μm), for example, located along a same plane and are within 10 μm, 5 μm, 1 μm, or 0.5 μm. When referring to "substantially" the same numerical value or feature, the term may refer to a value that is within ±10%, +5%, ±1%, or +0.5% of an average value of the values.

As used herein, the terms "approximately", "substantially", "basically", and "about" are used to describe and explain small variations. When used with reference to an event or a case, the terms may refer to an example in which the event or the case precisely occurs and an example in which the event or the case approximately occurs. For example, when used with reference to a numerical value, the terms may refer to a variation range less than or equal to ±10% of the numerical value, for example, less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, if a difference between two numerical values is less than or equal to ±10% (for example, less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%) of an average value of the values, the two numerical values may be considered to be "substantially" or "about" the same. For example, "substantially" parallel may refer to an angle variation range less than or equal to ±10° relative to 0°, for example, less than or equal to ±5°, less than or equal to ±4°, less than or equal to ±3°, less than or equal to ±2°, less than or equal to ±1, less than or equal to ±0.5°, less than or equal to ±0.1°, or less than or equal to ±0.05°. For example, "substantially" perpendicular may refer to an angle variation range less than or equal to ±10° relative to 90°, for example, less than or equal to ±5°, less than or equal to ±4°, less than or equal to ±3°, less than or equal to ±2°, less than or equal to ±1, less than or equal to ±0.5°, less than or equal to ±0.1°, or less than or equal to ±0.05°.

For example, if a displacement between two surfaces is equal to or less than 5 μm, equal to or less than 2 μm, equal to or less than 1 μm, or equal to or less than 0.5 μm, the two surfaces may be considered to be coplanar or substantially coplanar. If a displacement between any two points on a surface relative to a plane on the surface is equal to or less than 5 μm, equal to or less than 2 μm, equal to or less than 1 μm, or equal to or less than 0.5 μm, the surface may be considered to be planar or substantially planar.

As used herein, unless the context clearly stipulates otherwise, singular terms "a/an" and "the" may include plural indicators. In description of some embodiments, that a component is provided "on" or "above" another component may cover a case that the former component is directly on the latter component (for example, in physical contact with the latter component), and a case that one or more intermediate components are located between the former component and the latter component.

As used herein, for ease of description, spatially relative terms such as "beneath", "below", "lower", "above", "upper", "lower", "left side", and "right side" may be used herein to describe a relationship between one component or feature and another component or feature as illustrated in the figures. In addition to the orientation depicted in the figures, the spatially relative terms are intended to cover different orientations of an apparatus during use or operation. The device may be oriented in another manner (rotated by 90° or at another orientation), and the spatially relative descriptors used herein may also be correspondingly explained. It should be understood that when a component is referred to as being "connected to" or "coupled to" another component, the component may be directly connected to or coupled to the another component, or an intermediate component may exist.

The foregoing summarizes features of several embodiments and detailed aspects of the present disclosure. The embodiments described in the present disclosure can be easily used as a basis for designing or modifying other processes and a structure for performing the same or similar objectives and/or obtaining the same or similar advantages of the embodiments introduced herein. These equivalent constructions do not depart from the spirit and scope of the present disclosure, and different variations, replacements, and changes may be made without departing from the spirit and scope of the present disclosure.

We claim:

1. An autonomous mobile machine, comprising a controller, the controller executing program instructions to implement the following steps:

obtaining, by a sensor, an initial current frame;

creating a first two-dimensional region according to the initial current frame; and after the first two-dimensional region is created, driving autonomous mobile machine to move;

obtaining, by the sensor, a first current frame;

retrieving an adjacent region corresponding to the first current frame according to a pose of the first current frame;

determining whether the adjacent region corresponding to the first current frame is the same as an adjacent region corresponding to a previous frame of the first current frame;

updating a region list stored in a first storage medium in response to that the adjacent region corresponding to the first current frame is different from the adjacent region corresponding to the previous frame of the first current frame, wherein the region list records the adjacent region corresponding to the first current frame;

loading, from a second storage medium, a pose and point cloud data of a key frame corresponding to a newly added region in the region list into the first storage medium; and deleting region data that is in the first storage medium and that is not of the adjacent region corresponding to the first current frame.

2. The autonomous mobile machine according to claim 1, wherein the controller further executes the program instructions to implement the following steps:

generating point cloud data of the first current frame; and loading a point cloud map feature description of the adjacent region from the second storage medium.

3. The autonomous mobile machine according to claim 2, wherein the controller further executes the program instructions to implement the following steps:

comparing a similarity between the first current frame and the point cloud map feature description according to the pose and point cloud data of the first current frame, to obtain an initial pose.

4. The autonomous mobile machine according to claim 3, wherein the controller further executes the program instructions to implement the following steps:

determining a pose and point cloud data of a nearest neighbor key frame from the first storage medium according to the initial pose.

5. The autonomous mobile machine according to claim 4, wherein the controller further executes the program instructions to implement the following steps:

obtaining localization of the autonomous mobile machine according to the point cloud data of the first current frame and the pose and the point cloud data of the nearest neighbor key frame.

6. The autonomous mobile machine according to claim 1, wherein the controller further executes the program instructions to implement the following steps:

driving the sensor to obtain a second current frame in response to that the autonomous mobile machine operates in a mapping mode;

generating point cloud data of the second current frame;

determining whether the second current frame is in an existing region according to a pose and the point cloud data of the second current frame; and creating a new region in response to that the second current frame is not in an existing region.

7. The autonomous mobile machine according to claim 6, wherein the controller further executes the program instructions to implement the following steps:

determining, in response to that the second current frame is in an existing region, whether region data that is in the first storage medium and that is not of an adjacent region corresponding to the second current frame exists in the second storage medium.

8. The autonomous mobile machine according to claim 7, wherein the controller further executes the program instructions to implement the following steps:

deleting, in response to that the region data that is in the first storage medium and that is not of the adjacent region corresponding to the second current frame exists in the second storage medium, the region data that is in the first storage medium and that is not of the adjacent region corresponding to the second current frame; and storing, in response to that the region data that is in the first storage medium and that is not of the adjacent region corresponding to the second current frame does not exist in the second storage medium, the region data that is in the first storage medium and that is not of the adjacent region corresponding to the second current frame into the second storage medium.

9. The autonomous mobile machine according to claim 7, wherein the controller further executes the program instructions to implement the following steps:

matching the second current frame with the region data of the adjacent region corresponding to the second current frame.

10. The autonomous mobile machine according to claim 9, wherein the controller further executes the program instructions to implement the following steps:

using the second current frame as a key frame in response to creating the new region;

determining whether the second current frame is a key frame in response to that the second current frame is in an existing region; and storing the pose and the point cloud data of the second current frame into a region corresponding to the first storage medium in response to that the second current frame is a key frame.

11. The autonomous mobile machine according to claim 10, wherein the controller further executes the program instructions to implement the following steps:

downsampling the point cloud data of the second current frame.

12. The autonomous mobile machine according to claim 11, wherein the controller further executes the program instructions to implement the following steps:

generating a point cloud map feature description according to the downsampled point cloud data of the second current frame; and storing the point cloud map feature description into the second storage medium.

13. The autonomous mobile machine according to claim 9, wherein the controller further executes the program instructions to implement the following steps:

matching the second current frame with the region data of the adjacent region corresponding to the second current frame and outputting the pose of the second current frame, in response to that the second current frame is not a key frame.

14. The autonomous mobile machine according to claim 13, wherein the matching the second current frame with the region data of the adjacent region corresponding to the second current frame comprises:

registering the second current frame with a previous frame of the second current frame by an algorithm, so that the second current frame and the previous frame of the second current frame are aligned in a same coordinate system, to minimize an error between two frames of point clouds.

15. The autonomous mobile machine according to claim 14, wherein the matching the second current frame with the region data of the adjacent region corresponding to the second current frame further comprises:

converting the second current frame into a same coordinate system as the region data of the adjacent region corresponding to the second current frame.

16. The autonomous mobile machine according to claim 15, wherein the matching the second current frame with the region data of the adjacent region corresponding to the second current frame further comprises:

matching the second current frame with point cloud data of a key frame closest to the second current frame in the region data of the adjacent region corresponding to the second current frame.

17. The autonomous mobile machine according to claim 2, wherein the generating point cloud data of the first current frame comprises:

performing near-range point cloud filtering on an original point cloud of the first current frame to generate an unobstructed point cloud; and downsampling the unobstructed point cloud to generate a sparse point cloud.

18. A controller, configured to execute program instructions, to implement the following steps:

obtaining, by a sensor, an initial current frame;

creating a first two-dimensional region according to the initial current frame; and after the first two-dimensional region is created, driving autonomous mobile machine to move;

obtaining, by the sensor, a first current frame;

retrieving an adjacent region corresponding to the first current frame according to a pose of the first current frame;

determining whether the adjacent region corresponding to the first current frame is the same as an adjacent region corresponding to a previous frame of the first current frame;

updating a region list in a first storage medium in response to that the adjacent region corresponding to the first current frame is different from the adjacent region corresponding to the previous frame of the first current frame, wherein the region list records the adjacent region corresponding to the first current frame;

loading, from a second storage medium, a pose and point cloud data of a key frame corresponding to a newly added region in the region list into the first storage medium; and deleting region data that is in the first storage medium and that is not of the adjacent region corresponding to the first current frame.

19. A control method for an autonomous mobile machine, comprising:

obtaining, by a sensor, an initial current frame;

creating a first two-dimensional region according to the initial current frame; and after the first two-dimensional region is created, driving autonomous mobile machine to move;

obtaining, by the sensor, a first current frame;

retrieving an adjacent region corresponding to the first current frame according to a pose of the first current frame;

determining whether the adjacent region corresponding to the first current frame is the same as an adjacent region corresponding to a previous frame of the first current frame;

updating a region list in a first storage medium in response to that the adjacent region corresponding to the first current frame is different from the adjacent region corresponding to the previous frame of the first current frame, wherein the region list records the adjacent region corresponding to the first current frame;

loading, from a second storage medium, a pose and point cloud data of a key frame corresponding to a newly added region in the region list into the first storage medium; and deleting region data that is in the first storage medium and that is not of the adjacent region corresponding to the first current frame.

* * * * *